(12) United States Patent
Heckendorf, III et al.

(10) Patent No.: US 7,922,586 B2
(45) Date of Patent: Apr. 12, 2011

(54) ACTIVE PLAY INTERACTIVE GAME SYSTEM

(76) Inventors: Francis Aicher Heckendorf, III, Englewood, CO (US); Mathew N. Matelan, New York, NY (US)

( * ) Notice: Subject to any disclaimer, the term of this patent is extended or adjusted under 35 U.S.C. 154(b) by 401 days.

(21) Appl. No.: 11/386,412

(22) Filed: Mar. 22, 2006

(65) Prior Publication Data
US 2007/0167236 A1 Jul. 19, 2007

Related U.S. Application Data

(60) Provisional application No. 60/664,855, filed on Mar. 22, 2005.

(51) Int. Cl.
*A63F 13/00* (2006.01)
*A63B 67/02* (2006.01)
(52) U.S. Cl. .................. 463/42; 463/3; 463/23; 463/37; 273/108.2; 273/245; 273/317.2; 273/441; 473/131; 434/252; 340/426.19; 340/539.13
(58) Field of Classification Search .................. 463/2–3, 463/5, 7, 23, 30–32, 36–37, 42–43, 46–47, 463/50, 53, 56; 273/108.2, 108.21, 150, 273/245, 317.1, 317.2, 329–331, 359, 366–368, 273/406–408, 441, 444–446, 453, 460–461; 473/131, 140–141, 143, 145–146, 150–153, 473/156, 158, 160, 202, 206–217, 219, 221–223, 473/225–226, 257, 266, 280, 353, 405; 434/252; 340/426.19, 539.13; 342/357.06, 357.08, 342/357.12; 701/213–215
See application file for complete search history.

(56) References Cited

U.S. PATENT DOCUMENTS

| | | | |
|---|---|---|---|
| 5,319,548 A | 6/1994 | Germain | |
| 5,434,789 A | 7/1995 | Fraker et al. | |
| 5,810,680 A | 9/1998 | Lobb et al. | |
| 6,059,672 A | 5/2000 | Zeiner-Gundersen | |
| 6,111,541 A * | 8/2000 | Karmel | 342/357.13 |
| 6,263,279 B1 * | 7/2001 | Bianco et al. | 701/213 |
| 6,324,473 B1 * | 11/2001 | Eschenbach | 701/215 |

(Continued)

OTHER PUBLICATIONS

Tiger Woods PGA Tour 2004; (see in entirety) NBA Live 2003 (see in entirety).*

*Primary Examiner* — David L Lewis
*Assistant Examiner* — Arthur O. Hall
(74) *Attorney, Agent, or Firm* — Daniel P. Dooley; Fellers, Snider, et al.

(57) ABSTRACT

A system featuring a server communicating with the network with game hosting software programmed on the server, a terrain database and a time sequence GPS position linked message database each stored on the server and accessed by the game hosting software is disclosed. The terrain database stores a plurality of three dimensional renderings of golf courses created from digital aerial photographs of each golf course, wherein each photo includes elevational and slope data for each aerial photo. The time sequence GPS position linked message database contains a plurality of messages collected by a portable computing device and transmitted to the server by the device during an actually played round of golf. Each message is: transmitted by the device to the server; associated with an elapsed time from the beginning of the play of the round of golf, and linked to a GPS determined position from where the message was transmitted.

7 Claims, 3 Drawing Sheets

U.S. PATENT DOCUMENTS

| | | | |
|---|---|---|---|
| 6,334,613 B1 * | 1/2002 | Yoseloff | 273/292 |
| 6,456,938 B1 | 9/2002 | Barnard | |
| 6,490,521 B2 * | 12/2002 | Wiener | 701/211 |
| 6,592,473 B2 | 7/2003 | McDonald et al. | |
| 6,691,032 B1 * | 2/2004 | Irish et al. | 701/213 |
| 6,705,942 B1 * | 3/2004 | Crook et al. | 463/3 |
| 6,757,572 B1 | 6/2004 | Forest | |
| 6,998,965 B1 * | 2/2006 | Luciano et al. | 340/323 R |
| 7,013,216 B2 * | 3/2006 | Walters et al. | 701/200 |
| 7,072,665 B1 * | 7/2006 | Blumberg et al. | 455/456.1 |
| 7,118,498 B2 * | 10/2006 | Meadows et al. | 473/407 |
| 7,192,359 B1 * | 3/2007 | Lundgren et al. | 473/131 |
| 7,376,388 B2 * | 5/2008 | Ortiz et al. | 455/3.06 |
| 7,435,179 B1 * | 10/2008 | Ford | 463/42 |
| 7,689,229 B2 * | 3/2010 | Geary et al. | 455/456.1 |
| 7,837,572 B2 * | 11/2010 | Bissonnette et al. | 473/151 |
| 2002/0004723 A1 | 1/2002 | Meifu et al. | |
| 2002/0060642 A1 * | 5/2002 | Togasaka | 342/357.09 |
| 2002/0072815 A1 | 6/2002 | McDonough et al. | |
| 2002/0077164 A1 | 6/2002 | Sundstrom | |
| 2002/0087223 A1 * | 7/2002 | Moffatt et al. | 700/92 |
| 2002/0099457 A1 | 7/2002 | Fredlund et al. | |
| 2002/0143729 A1 * | 10/2002 | Fostick | 707/1 |
| 2002/0151994 A1 | 10/2002 | Sisco | |
| 2002/0161461 A1 | 10/2002 | Lobb et al. | |
| 2002/0188359 A1 | 12/2002 | Morse | |
| 2003/0163541 A1 * | 8/2003 | Austin et al. | 709/207 |
| 2003/0191547 A1 * | 10/2003 | Morse | 700/91 |
| 2004/0243262 A1 * | 12/2004 | Hofmann | 700/91 |
| 2005/0037747 A1 * | 2/2005 | Geary et al. | 455/422.1 |
| 2005/0037872 A1 | 2/2005 | Fredlund et al. | |
| 2005/0227791 A1 * | 10/2005 | McCreary et al. | 473/407 |
| 2005/0250590 A1 * | 11/2005 | Doaga et al. | 473/150 |

* cited by examiner

ACTIVE PLAY INTERACTIVE GAME SYSTEM

RELATED APPLICATIONS

The present application claims priority to U.S. Provisional Application No. 60/664,855 filed Mar. 22, 2005, entitled Active Play Interactive Game System.

BACKGROUND OF THE INVENTION

1. Field of the Invention

The present invention relates to a computerized system with interactive software. More particularly, but not by way of limitation, the present invention relates to an active play interactive game system that accommodates interaction between the interactive software and an actual, physical play of a game for a future re-creation of the actual physical play of the game, and for simultaneous coordination and communication between multiple players of the game, regardless of the physical location of the players.

2. Background of the Invention

Virtual reality games and video games depend on inputs from a player responding to depicted events that visually appear on a screen. For example, virtual reality games frequently involve a wearing of motion transmitters on select extremities of an individual playing the game. The motion transmitters translate motion of the extremity to an action on the screen, such as a response of a soccer ball to a simulated kick of the ball by the player.

Video games are frequently controlled by a player's input on keys of a computer keyboard, or buttons on a game controller. Timing of the activation of the keys or buttons is often a key variable in success in playing the game. For example, the timing for discontinuing of a back stroke and beginning of a fore stroke of a simulated golf stroke, i.e., activation of appropriate keys or buttons, determines the success of a computer simulated golf shot. In either example, the lack of the physical playing environment, playing conditions, footing, actual equipment, and competitive pressures brought to bear by actual competitors, renders virtual reality games and video games, a separate form of recreation from the sporting events they try to simulate. Accordingly, limited improvement in an individual's ability to actively play their sport of choice is derived from playing a simulation of their sport of choice. As such, challenges remain and a need persists for improvements in integrating an actual physical play of a sport with simulations of the sport to enhance both the skill and enjoyment of the player playing the sport, and it is to these needs and challenges that the present invention is directed.

SUMMARY OF THE INVENTION

In accordance with a preferred embodiment, a system featuring a server communicating with the network with game hosting software programmed on the server, a terrain database and a time sequence GPS position linked message database each stored on the server and accessed by the game hosting software is provided. Preferably, the terrain database stores a plurality of three dimensional renderings of golf courses created from digital aerial photographs of each golf course, wherein each photo includes elevational and slope data for each aerial photo, and the time sequence GPS position linked message database preferably contains a plurality of messages collected by a portable computing device and transmitted to the server by the device during an actually played round of golf. In a preferred embodiment, each message is: transmitted by the portable computing device to the server; associated with an elapsed time from the beginning of the play of the round of golf; and linked to a GPS determined position from where the message was transmitted.

The system of the preferred embodiment further features a client computing device that includes at least a processor programmed with a game strategy, analysis, and playback software module and configured for interaction with the game hosting software module; and means for communicating with the server across the network. Preferably, the means for communicating with the server across the network is a voice/data transceiver controlled by the processor, which facilitates interaction between the game strategy, analysis, and playback software module, and the game hosting software module across the network.

The system of the preferred embodiment further features a portable computing device that includes at least a mobile processor programmed with an active game support software module and configured for interaction with the game strategy, analysis, and playback software module; and means for communicating with the client computing device. Preferably, the means for communicating with the client computing device is a local wireless transceiver controlled by the mobile processor, which facilitates interaction between the active game support software module, and the game strategy, analysis, and playback software modules.

In accordance with an alternate preferred embodiment of the present invention, a method of producing an animated presentation for playback of an actually played round of golf is presented. The method preferably includes at least the steps of activating a portable computing device programmed with an active game support software module and comprising a global positioning system (GPS) receiver; initiating an actual round of golf played on a physical golf course of choice; recording a GPS determined position of a golf ball relative to the physical golf course of choice using a voice/data transceiver of the portable computing device; and striking the golf ball with a golf club to advance the ball along the physical golf course of choice.

The method of the alternate preferred embodiment further preferably includes at least the additional steps of: packaging a message for delivery to a server communicating with a network; measuring an elapsed time between a beginning of a transmission of the packaged message, and the initiation of the round of golf; transmitting the packaged message, measured elapsed time, and GPS determined position of a golf ball to the server using the voice/data transceiver; and storing the message, elapsed time, and GPS determined position of the golf ball in a time sequence; and GPS position linked message database on the server.

These and various other features and advantages which characterize the claimed invention will be apparent from reading the following detailed description and a review of the associated drawings.

DESCRIPTION OF THE PREFERRED EMBODIMENTS

Before explaining the present invention in detail, it is important to understand that the invention is not limited in its application to the details of the construction illustrated, or by the steps of construction inherently present by way of illustration of the appended drawings. The invention is capable of other embodiments and of being practiced or carried out in a variety of ways. It is to be understood that the phraseology and terminology employed herein is for the purpose of description and does not impose limitation on the present invention. It is noted however, that the term "Active Play" as used herein means: physically engaging in an activity, such as playing a sport of interest; for example, physically playing a round of golf on an actual golf course, using actual golf clubs and hitting actual golf balls in accordance with the rules of the game.

Figure 1:
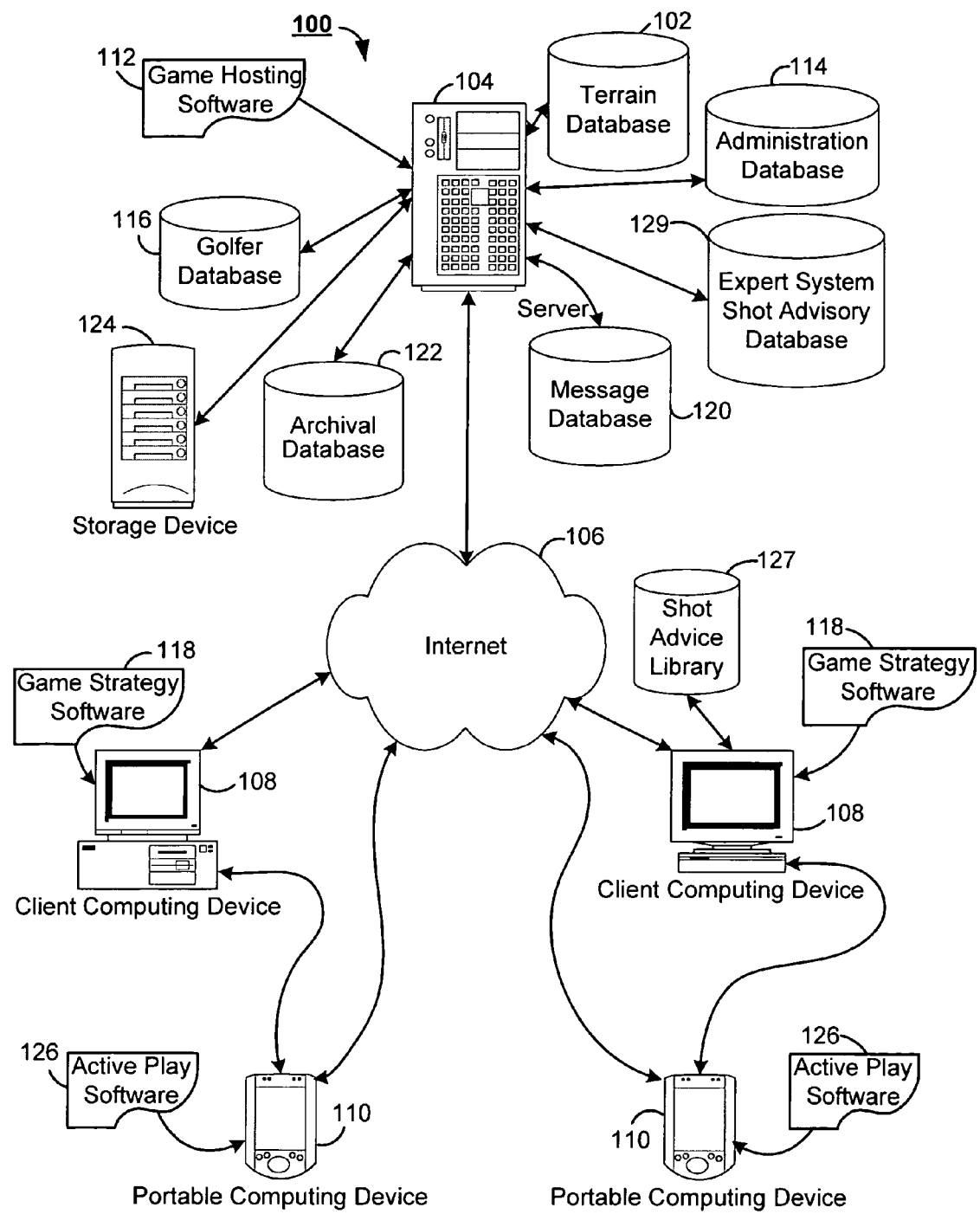
FIG. 1 shows a diagrammatical relationship of components of the present inventive system.

Referring now to the drawings, and in particular to an inventive active play interactive game system "inventive system" 100 as shown in FIG. 1. Not by way of limitation, but by way of illustration only, in a preferred embodiment the inventive system 100 is particularly useful as a service to Golf Enthusiasts ("Golfer"). Through utilization of the inventive system 100, a Golfer has the ability to interact with any of a plurality of select golf courses from around the world. Preferably, each of the plurality of golf courses offered to the Golfer for selection is stored as "flyover" image renderings, and three dimensional (3D) image renderings.

In a preferred embodiment, the flyover image renderings and the 3D image renderings are computer generated images that preferably utilize digital, aerial photographs that include elevational and slope of the terrain data (digital photos) as a basis for the flyover and 3D renderings. In a preferred embodiment of the inventive system 100, the digital photos are loaded into a 3D rendering tool, such as AutoCAD by Autodesk, Inc. of San Rafael, Calif., and the resulting flyover and 3D image renderings are stored in a terrain database 102 of a server 104, which is linked to a network, such as the internet 106. When accessed by a Golfer, the image renderings provide a basis for a planning tool used by the Golfer to strategize future play on a course selected from the terrain database 102. The image renderings further serve as a diagnostic tool for reviewing an actual round of golf played on the selected course, and for improved future play on the selected course as well as on all courses.

FIG. 1 further shows that the inventive system 100 includes at least a client computing device 108, and a portable computing device 110. Programmed onto the server 104, is a game hosting software module 112, which includes a Golfer Application, and an Administration Application.

The Administration Application preferably presents an interface for management and staff operations. It allows Company staff to enter accounting and user information for contracts. It also provides easy management of course data and upload of various files that are used in defining certain page features. After a data value is input, that value is displayed until it is changed. Users of this interface will input course definitions and other data, which will then be pushed to the Golfer Application for access by the system's customers. Management users of this interface will monitor workflow of such data and control role assignments. This data is stored in an Administration Database 114. The main features of the Administration Application include at least: accounting; workflow management; localization of a Golfer Application's static content; management of the Administration and Golfer Applications' user groups; and Golf Pro support features.

The Administration Database 114 preferably stores all user and role related data, transaction history, resource references and textual information. In addition, configuration information and data used in localization for both the Golfer and Administration Applications are stored in the Administration Database. Such information is input through the Administration Application User Interface.

The Golfer Application preferably drives off of a Golfer Database 116, and presents a customer interface, allows access on a role basis, and posts news items that may be of interest to the system's customers. In a preferred embodiment, the main features of the Golfer Application include at least: planning rounds; fantasy golf; golf play record keeping services; community services; e-commerce payment; and flyover as well as 3D views of golf holes. The Golfer Database 116 stores all files viewable through the Golfer Application. Such items are transferred to the Golfer Database 116 from the Administration Database 114. The items are preferably originally input and edited only through the Administration Application. They must be explicitly transferred to the Golfer Database 116 in an operation referred to as publishing.

The client computing device 108, preferably includes a game strategy, analysis, and playback software module "strategy module" 118, programmed on a processor (not separately shown). The strategy module 118 includes a plurality of capabilities available on the Golfer Application, and in particular the strategy module 118 is configured for interaction with the game hosting software module 112 to download, display, manipulate, and configure for use by the portable computing device 110, information stored in a number of databases associated with the server 104. Included among the databases accessible by the portable computing device 110 are: the terrain database 102; a Message Database 120 (to be discussed in greater detail below); and an Archival Database 122 (used for storing prior golf rounds and match play).

Using the portable computing device 110, the Golfer will preferably be able to chart ball position from each stroke while actively playing a round of golf. Preferably, the collected information can either be transmitted to the server 104 during the round, or it can be downloaded from the portable computing device 110 to the client computing device 108, and then transferred to the server 104 across the internet 106. The transfer of the collected data to the server 104 allows the Golfer to closely examine their play, hole-by-hole and club-by-club to make necessary changes to lower their scores. It is noted that in a preferred embodiment, each of the databases associated with the server 104 are typically contained in a storage device such as 124.

Through use, by multiple Golfers, of the portable computing device 110, and an active game support software module "active play module" 126 programmed on a mobile processor 128 (of FIG. 2), and configured for interaction with the strategy module 118, Golfers can play matches either simultaneously, or at different times of the same or different courses. Through calculations based on figures of merit for each hole, the active play module 126, allows play on different courses to be normalized so that competitive rounds can be played between Golfers playing on different courses.

Preferably, simultaneous players can communicate using a voice/data transceiver 130 (see FIG. 2) of the portable computing device 110. Through use of the voice/data transceiver 130, each of the simultaneous players can access each of the other players' positions, scores, and course view during a match, if the match had been set up on the server 104 by the participants of the match. Follow-up play is used by players that played at different times. Data from all players is collected by the system allowing Golfers to view rounds as if they were in the same match. Of course, follow up can be used by simultaneous play Golfers also, to improve their games and increase their enjoyment. As will be appreciated by those skilled in the art, the inventive system 100 could also serve to host legal gaming activity.

In an alternate embodiment and for a fee, Golfers can preferably pit their game in a heads-up simultaneous round of golf (or later in follow-up rounds) against professional tour players, celebrities, or other participants in events such as Pro-Am tournaments. For example, Golfers from across the country could play a simultaneous round of golf with Tiger Woods during Tiger's play at the Masters. Through data gathered and transmitted during play at the tournament, information for each professional golfer in the tournament, including Tiger Woods, could be obtained from data provided by an association sponsoring the event, or by individuals attending the event, equipped with a portable computing device 110, and assigned a professional golfer to track during the course of play. In either case, by tracking a professional player's activity stroke-by-stroke, hole-by-hole and uploading the data to the Golfer Database 116 of the server 104, each professional player would be seen as another simultaneous player.

Figure 2:
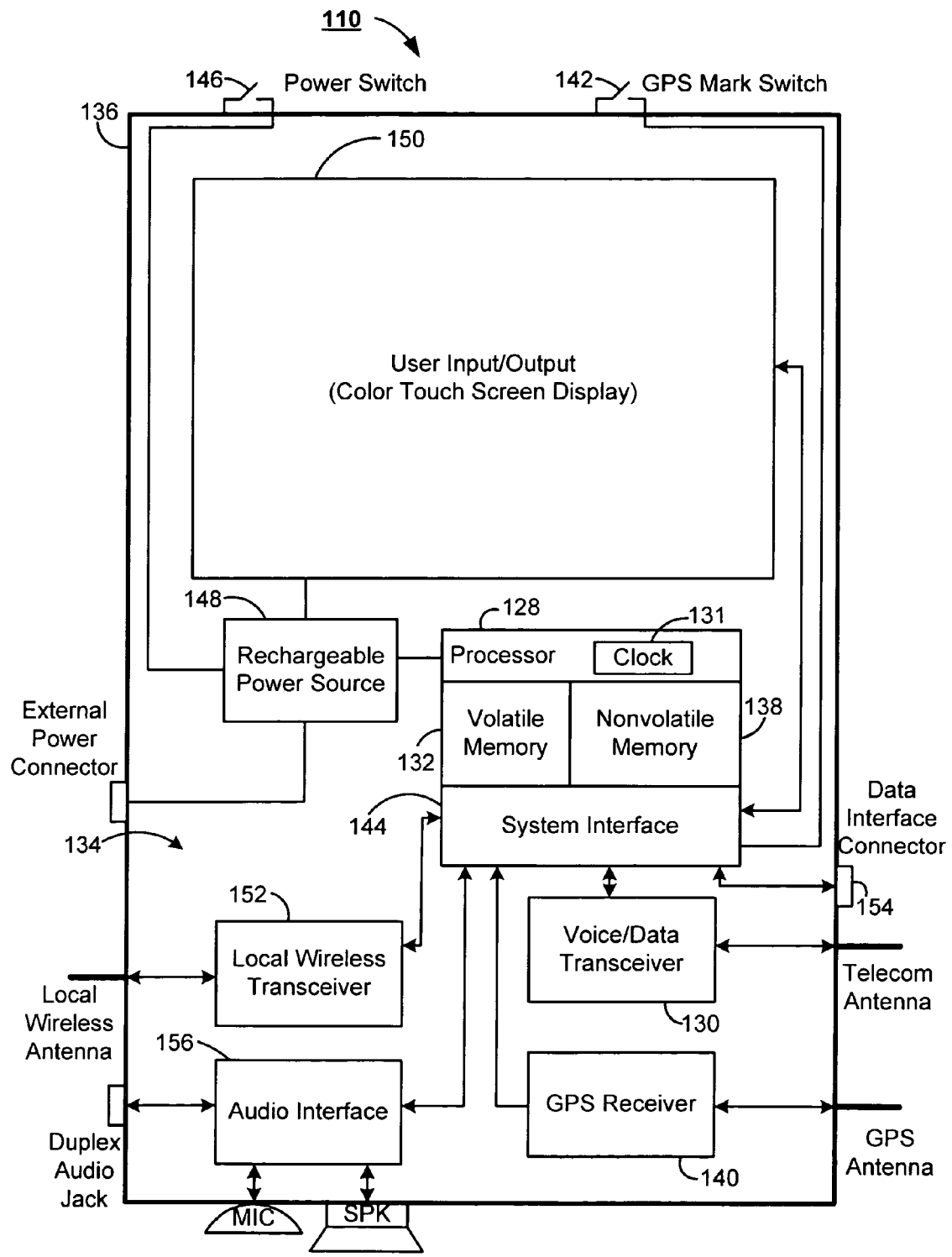
FIG. 2 provides a function block diagram of a portable computing device of the inventive system of FIG. 1.

Turning to FIG. 2, the portable computing device 110 shown therein, preferably includes the voice/data transceiver 130, the mobile processor 128, with at least a memory portion 132. In a preferred embodiment, the mobile processor 128 is attached to a printed circuit board assembly "PCBA" 134, and the PCBA 134 is secured to an enclosure 136. During an execution by the mobile processor 128 of the active play module 126 (of FIG. 1), a preferred use of the memory portion 132 is that of a cache memory in support of the mobile processor 128. Additionally, the PCBA 134 provides support and connectivity between a nonvolatile memory 138 and the mobile processor 128.

As will be appreciated by those skilled in the art, the nonvolatile memory 138 can take form from a plurality of memory devices that include at least: read-only memory (ROM); electrically erasable programmable read-only memory (EEPROM); flash memory; or a hard disk drive compatible with PCMCIA Type II interface port. The nonvolatile memory 138 provides storage for support software and data downloaded from the client computing device 108 (of FIG. 1), useful to the Golfer for collecting data associated with a round of golf.

FIG. 2 further shows a global positioning system (GPS) receiver 140 supported by the PCBA 134. In response to an activation of a GPS mark switch 142, a system interface 144 prompts the GPS receiver 140 to forward a then current positional location of the GPS receiver 140 to the mobile processor 128. The mobile processor 128 interprets the positional location of the GPS receiver 140 as a current position of a golf ball, and calculates the position of the golf ball relative to a "flyover" rendered image, and a 3D rendered image of the golf course identified by the Golfer as the course being played. The mobile processor 128, depending on parameters set by the Golfer, either stores the positional information in the nonvolatile memory 138, or directs the voice/data transceiver 130 to communicate the information to the server 104 (of FIG. 1).

In a preferred embodiment, the enclosure 136 supports a power switch 146, which engages a rechargeable power source 148 when activated. Engagement of the rechargeable power source 148 provides energy for powering the components and functions of the portable computing device 110. Upon power up of the mobile processor 128, the operational software (i.e., the active play module 126 (of FIG. 1)), is accessed by the mobile processor 128. Following power up, communication and functionality by and between the active components of the portable computing device 110, are preferably verified. Upon verification of a proper operational state of the active components of the portable computing device 110, the mobile processor 128 determines a number of course specific parameters to be monitored. Included among the monitored parameters are the GPS position locations of each tee, of each hole of the course selected by the Golfer for play, and an elapsed time from the initiation of the round of golf. As explained in greater detail below, the elapsed time of play is useful in reconstructing an animation of the actual round of golf played by the Golfer, which the Golfer may use for enjoyment, analysis and improvement of their game. To track the elapsed time, an internal clock 131 of the mobile processor 128 is provided.

It is noted that during the download of course specific data from the client computing device 108 onto the portable computing device 110, the positional location of each tee and each cup of each green of each hole are included for use during active play of the course. As those skilled in the art will recognize, the position of the cup on the green is altered from time to time, to reposition the pin location in various spots around the green. To ensure an accurate representation of each golf course, the golf pro for each golf course updates the terrain database 102 (of FIG. 1) with the most recent cup location, when the cup location is physically changed. Preferably the golf pro utilizes the GPS receiver 142, and the voice/data transceiver 130 of the portable computing device 110, to update the terrain database 102.

During the course of play of the round of golf, the mobile processor 128 polls the GPS receiver 140 for positional information. The positional information reported by the GPS receiver 140 is used to choose a flyover image of the golf hole associated with the tee, which is provided to the Golfer via a display 150. The positional information reported by the GPS receiver 140 is also used by the mobile processor 128 to set up the portable computing device 110 for active play of the identified hole. In a preferred embodiment, the display 150 is a touch screen input/output device for the portable computing device 110, and either a local wireless transceiver 152, or a data interface connector 154 is utilized for data transfer between the client computing device 108, and the portable computing device 110.

Because the GPS positional location of each tee and each cup of each hole are downloaded onto the portable computing device 110, if a Golfer wishes to know a distance from their current position to any position on the hole, the Golfer merely touches the display 150 at the point of interest on the flyover image of the golf hole (for example with the tip of a golf tee), and preferably through triangulation the distance to the point of interest is reported to the Golfer. In a preferred embodiment, prior to downloading the imagery and GPS positional information associated with the course of interest, the Golfer strategizes his play of the course. The Golfer's strategy is captured by the client computing device 108 and integrated with the imagery and GPS positional information data of the course of interest. By selecting and identifying specific clubs the Golfer plans to use for each shot during the play of the course, the distance the Golfer expects to achieve by use of the selected club, and the location on the hole the Golfer expects to achieve from the shot, the Golfer can plan his entire round of golf, hole-by-hole, and shot-by-shot.

If during play of the course a shot does not go in accordance with the plan, the Golfer can modify the play plan by: marking the GPS position of the ball relative to the hole being played; identifying a location on the course to which the Golfer wishes to advance the ball; touching the identified location on the flyover image provided by the display 150 with the tip of the golf tee; observing the distance determined by the mobile processor 128; and selecting a club from the Golfer's golf club bag that the Golfer believes will attain the determined distance. Alternatively, a Golf Pro (for the course being played and equipped with the portable computing device 110), may be consulted for advice. For a predetermined fee, upon missing a shot, the Golfer may solicit advice from the Golf Pro regarding the next best shot to play, or instead the Golfer may obtain advice from an expert system type shot advisory database, such as 129 (of FIG. 1).

To acquire the advice from the Golf Pro, the voice/data transceiver 130 of the Golfer's portable computing device 110 is activated by the Golfer, and a message is transmitted to the voice/data transceiver 130 of the Golf Pro's portable computing device 110. Upon receiving the transmission, the mobile processor 128 of the Golf Pro's portable computing device 110: pulls up the flyover image of the hole being played by the Golfer; identifies the position of the Golfer's ball relative to the hole being played; notifies the Golf Pro that a message has been received; and upon activation of an audio interface 156 of the Golf Pro's portable computing device 110, the message from the Golfer is provided to the Golf Pro preferably in an audio form, to which the Golf Pro returns an advice message to the Golfer. The Golf Pro may deliver the message to the Golfer as a voice message, a text e-mail to the Golfer, or the Golf Pro may elect to communicate directly with the Golfer using the voice/data transceiver 130 as a cellphone type device. It is noted that in a preferred embodiment, each portable computing device includes a voice recognition program, and a text to voice program.

The voice recognition program is useful in providing commands to the portable computing device 110, recording data and messages throughout active play of the course, and constructing text messages for delivery by the voice/data transceiver 130. The text to voice program is useful in reading text messages received by the Golfer during the play of the course, and providing audio input to the Golfer based on the Golfer's own strategized play of the course.

In an alternate embodiment, and for a reduced fee, the message is received by the Golf Pro's client computing device 108. Upon receipt of the Golfer's message the Golf Pro's client computing device 108, the position of the Golfer's ball relative to the hole being played is analyzed, a shot advice library 127 (of FIG. 1) (stored within the Golf Pro's client computing device 108 and constructed by the pro) is accessed, and an advice message is selected from the library and transmitted back to the Golfer.

Figure 3:
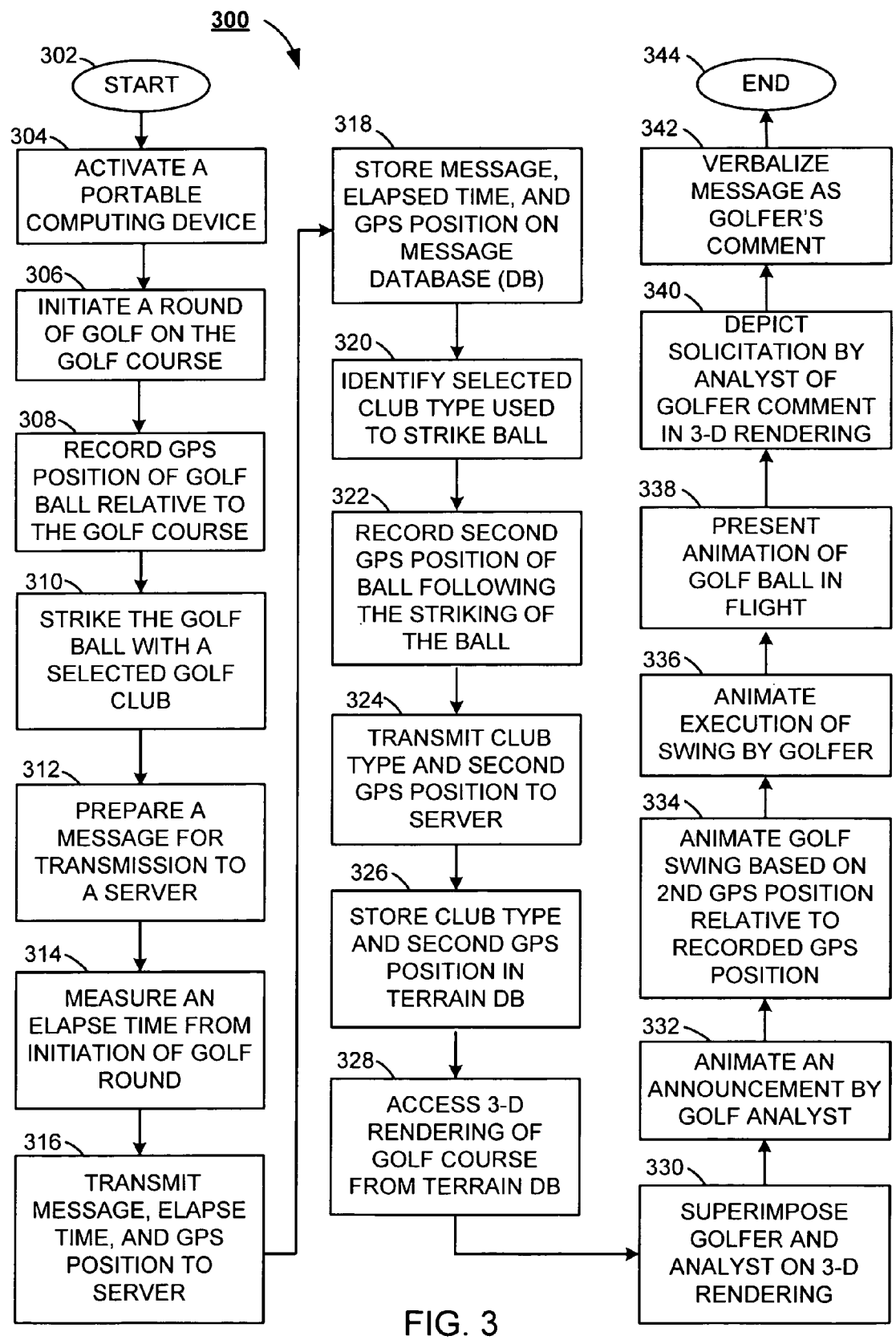
FIG. 3 illustrates a flow chart of a method of using the inventive system of FIG. 1.

FIG. 3 shows a method 300 of using an inventive interactive game system (such as 100), commencing at process start step 302 and continuing at process step 304 with an activation of a portable computing device (such as 110) that includes at least a global positioning system (GPS) receiver (such as 140), and is preferably programmed with an active game support software module (such as 126).

At process step 306, the method 300 continues with an initiation of a round of golf on a golf course. Following power up of the portable computing device, the initiation of an active round of golf is preferably communicated to a server (such as 104) in the form of a transmission by a voice/data transceiver (such as 130) of the portable computing device that the Golfer has entered the first hole of the course. A time of the transmission of the Golfer's presence on the first hole of the course is recorded as the start time for the round of golf. The start time in obtained by referencing a clock (such as 131), of a mobile processor (such as 128), of the portable computing device.

The method 300 continues at process step 308 with an activation of a GPS mark switch (such as 142), which results in a recording of a GPS determined position of a golf ball relative to the golf course, that is relative to 3D and flyover rendered images of the golf course. It is noted that the GPS mark switch may be activated by a voice command, a physical depression of a switch, or by other activation means. At process step 310, the Golfer alerts the portable computing device as to which position, of a plurality of positions the Golfer will tee-up their shot, and proceeds with striking the golf ball with a golf club to advance of the ball along the golf course.

Continuing with process step 312, the Golfer initiates the portable computing device that prepares a message for delivery to the server, which preferably communicates with a network (such as 106). A typical message may be a comment on how well or how poorly the shot went, and why the shot went so well, or so poorly. At process step 314, an elapsed time from the initiation of the round of golf and a beginning of a transmission of the prepared message is measured and recorded. Following the transmission to the server of the prepared message, the measured elapsed time, and the GPS determined position of the golf ball via the voice/data transceiver at process step 316, the message, elapsed time, and GPS determined position of the golf ball is stored in a time sequence and GPS position linked message database (such as 120) of the server at process step 318.

In a preferred embodiment, the golfer trains the voice recognition program by announcing a predetermined set of messages into the portable computing device 110. Included among the messages for recitation by the golfer are: a pronunciation of the names of the various golf clubs available to the golfer; a pronunciation of the number of holes of the golf course, for example "the ninth hole;" and common golf terms such as fee, tee box, hole, cup, pin, green, fairway, rough, sand trap, bunker, swing, sliced, hook, and so forth. Training the voice recognition program improves the accuracy and usefulness of the system when a player is using the system to analyze his play performance.

At process step 320, the Golfer identifies and reports to the portable computing device the type of the golf club (i.e., driver, 3 iron, 4 wood, etc.), used to strike the golf ball, and at process step 322, a second GPS determined position of the golf ball relative to the golf course resulting from the striking of the golf ball with the golf club is recorded on a nonvolatile memory (such as 138) of the portable computing device. At process step 324, the second GPS determined position of the golf ball, and the type of club used to make the shot is preferably transmitted to the server. Upon receipt of the club and position information, at process step 326 the server stores the club type used by the Golfer to make the shot in a Golfer Database (such as 116), and stores the second GPS determined position of the golf ball relative to the golf course in a terrain database (such as 102).

The method 300 continues at process step 328 with an accessing of the 3D image rendering of the golf course stored on the terrain database of the server, and superimposing an animation of the Golfer and a Golf Analyst on said image rendering at process step 330. At process step 332, an announcement by the animated Golf Analyst regarding the Golfer, type of golf club used to strike the golf ball, and the distance covered by the shot is synthesized for future playback. At process step 334, a re-creation preferably through animation of a golf swing for execution by said animated Golfer, based on a change of position of the golf ball relative to the golf course between said determined position and said second determined position, is animated for future use in a replay animation of the round of golf actively played by the Golfer.

At process step 336, a production of an animation of the animated version of the Golfer executing the re-created golf swing is produced by an animation tool stored on a storage device (such as 124) of the server. Following the generation of the animated Golfer executing the re-created golf swing, an animation of a flight of the golf ball resulting from the striking of the golf ball by the golf club, based on the change of position of the golf ball relative to the golf course is generated at process step 338. At process step 340, an appropriate setting for the animated interview is provided for the animated production, based on the position within the 3D image rendering, and the elapsed time from the initiation of the round of golf is provided, and through use of the animation tool, the animated Golf Analyst is depicted approaching the animated Golfer to solicit a comment by the animated Golfer following a conclusion of the animated flight of the golf ball. At process step 342, the message stored in the message database, consistent with the time and place of the animated interview is verbalized as the commentary delivered by the animated Golfer, and the method 300 concludes at end process step 344.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Such changes and modifications are encompassed within the spirit of this invention.

What is claimed is:

1. A system comprising:
a server with an integrated real-time Golfer database, the server communicating with a network;
a game hosting software module programmed on the server;
a terrain database stored on the server and accessed by the game hosting software module;
a time sequence and global positioning system (GPS) position linked message database stored on the server and accessed by the game hosting software module;
a client computing device communicating with the server through the network and interacting with the Golfer database; and
a portable computing device configured for communicating with each the server and the client computing device, the portable computing device interacting with the Golfer database when communicating with the server and providing a competitive match between a user and a competitor in which visual access to the competitor's in-progress golf round information from a first golf course is presented to the user during the user's in-progress golf round from a second golf course, wherein said first and second golf courses are distinct and different one from the other, the portable computing device configured to store a golf strategy in which at least one club and position of a golf shot in relation to a hole of the first golf course is selected by the user prior to the user addressing the golf ball with the selected at least one club at the hole of the first golf course during the competitive match, and in which said Golfer database includes at least data to provide a 3D view of at least a hole of each said first and second golf courses on said portable computing device, and further wherein the user selectively uses said at least one golf strategy during said competitive match to effect an outcome of the competitive match.

2. The system of claim 1, in which the client computing device comprising:
a processor;
a game strategy, analysis, and playback software module programmed on the processor and configured for interaction with the game hosting software module; and
means for communicating with the server across the network, wherein the means for communicating with the server across the network is controlled by the processor and facilitates interaction between the game strategy, analysis, and playback software module, and the game hosting software module across the network.

3. The system of claim 2, in which the portable computing device comprising:
a mobile processor;
an active game support software module programmed on the mobile processor and configured for interaction with the game strategy, analysis, and playback software module; and
means for communicating with the client computing device, wherein the means for communicating with the client computing device is controlled by the mobile processor and facilitates interaction between the active game support software module, and the game strategy, analysis, and playback software modules.

4. The system of claim 3, further comprising:
an enclosure supporting a printed circuit board assembly;
a processor attached to the printed circuit board assembly and comprising a memory portion;
a nonvolatile memory communicating with said processor; and
an active game support software module provided by the nonvolatile memory and executed by the said processor, wherein the execution of the active game support software module by the processor provides:
a global positioning system determined location of a golf ball relative to a golf course; and
a measurement of an elapsed time for play by a Golfer playing a round of golf on said golf course.

5. The system of claim 4, further comprising:
a system interface security to the printed circuit board assembly and communicating with the processor;
a global positioning system receiver attached to the printed circuit board assembly and communicating with the system interface;
a global positioning system activation means supported by the enclosure and communicating with the system interface; and
a voice/data transceiver supported by the printed circuit board assembly and communicating with the system interface, whereupon activation of said global positioning system activation means, said system interface collects position data, provided by said global positioning system receiver, and provides said position data to said processor.

6. The system of claim 5, in which said processor provides said position data to a server communicating with a network, wherein said position data is wrapped in a transmission packet and broadcast to said server by said voice/data transceiver, and in which the means for communicating with the client computing device comprising a touch screen input/output device of the portable computing device.

7. The system of claim 5, further comprising:
an input/output device supported by said enclosure and communicating with said systems interface; and
an audio interface attached to said printed circuit board assembly and communicating with said system interface, wherein said input/output device comprises a screen responsive to an applied pressure for inputting data to said software module, and wherein in response to voice commands said audio interface provides data input to said software module.

* * * * *